(12) United States Patent
Thexton et al.

(10) Patent No.: US 10,983,845 B2
(45) Date of Patent: Apr. 20, 2021

(54) CONTROLLING APPLICATIONS BY AN APPLICATION CONTROL SYSTEM IN A COMPUTER DEVICE

(71) Applicant: Avecto Limited, Manchester (GB)

(72) Inventors: Paul Thexton, Manchester (GB); Steven Joruk, Manchester (GB); Simon Fradkin, Manchester (GB)

(73) Assignee: AVECTO LIMITED, Manchester (GB)

( * ) Notice: Subject to any disclaimer, the term of this patent is extended or adjusted under 35 U.S.C. 154(b) by 0 days.

(21) Appl. No.: 16/566,332

(22) Filed: Sep. 10, 2019

(65) Prior Publication Data

US 2020/0081752 A1    Mar. 12, 2020

(30) Foreign Application Priority Data

Sep. 12, 2018  (GB) ..................... 1814798

(51) Int. Cl.
*G06F 9/54*   (2006.01)
*G06F 9/451*  (2018.01)

(52) U.S. Cl.
CPC ............. *G06F 9/543* (2013.01); *G06F 9/451* (2018.02)

(58) Field of Classification Search
None
See application file for complete search history.

(56) References Cited

U.S. PATENT DOCUMENTS

| 5,881,225 | A  | 3/1999  | Worth |
| 5,991,542 | A  | 11/1999 | Han et al. |
| 6,233,618 | B1 | 5/2001  | Shannon |
| 7,133,904 | B1 | 11/2006 | Soyha et al. |
| 7,219,354 | B1 | 5/2007  | Huang et al. |
| 8,368,640 | B2 | 2/2013  | Dardinski et al. |
| 9,158,662 | B1 | 10/2015 | Hanes et al. |
| 9,769,131 | B1 | 9/2017  | Hartley |

(Continued)

FOREIGN PATENT DOCUMENTS

| EP | 2750035 A1 | 7/2014 |
| GB | 2486528 B  | 9/2016 |

(Continued)

OTHER PUBLICATIONS

Combined Examination and Search Report dated Mar. 6, 2019 for United Kingdom Patent Application No. GB1814798.3.

(Continued)

*Primary Examiner* — Shih-Wei Kraft
(74) *Attorney, Agent, or Firm* — Morris, Manning & Martin, LLP; Daniel E. Sineway; Adam J. Thompson

(57) ABSTRACT

An application control system (ACS) in a computer device intercepts a request to launch a requested application by a calling process, and determines, based on the requested application, that user interaction is required before launch. In response, the ACS establishes whether or not the calling process is associated with a controlling terminal and, if so, performs the user interactions using that controlling terminal. Where the user interactions are successful then the intended application is permitted to launch or, conversely, the intended application may be denied. Other solutions are provided in the event that the calling process is not associated with the controlling terminal.

20 Claims, 7 Drawing Sheets

(56) References Cited

U.S. PATENT DOCUMENTS

| | | |
|---|---|---|
| 10,803,499 B1 | 10/2020 | Davis et al. |
| 2002/0144137 A1 | 10/2002 | Harrah et al. |
| 2002/0174256 A1 | 11/2002 | Bonilla et al. |
| 2004/0210771 A1* | 10/2004 | Wood .................. G06F 21/31 726/8 |
| 2005/0188370 A1 | 8/2005 | Kouznetsov et al. |
| 2006/0089834 A1 | 4/2006 | Mowatt et al. |
| 2007/0180502 A1 | 8/2007 | Yadav et al. |
| 2007/0198933 A1 | 8/2007 | Van Der Bogert et al. |
| 2008/0060051 A1 | 3/2008 | Lim |
| 2008/0289026 A1 | 11/2008 | Abzarian et al. |
| 2009/0070442 A1 | 3/2009 | Kacin et al. |
| 2010/0274366 A1 | 10/2010 | Fata et al. |
| 2011/0030045 A1* | 2/2011 | Beauregard ............ G06F 9/468 726/9 |
| 2011/0173251 A1 | 7/2011 | Sandhu et al. |
| 2011/0196842 A1 | 8/2011 | Timashev et al. |
| 2011/0239288 A1 | 9/2011 | Cross et al. |
| 2011/0251992 A1* | 10/2011 | Bethlehem ............ H04L 67/306 707/610 |
| 2012/0047259 A1 | 2/2012 | Krasser et al. |
| 2012/0054744 A1* | 3/2012 | Singh .................. G06F 9/45558 718/1 |
| 2012/0066512 A1 | 3/2012 | Kass et al. |
| 2012/0226742 A1* | 9/2012 | Momchilov .......... G06F 3/0481 709/203 |
| 2013/0057561 A1 | 3/2013 | Nave et al. |
| 2013/0339313 A1* | 12/2013 | Blaine ................ G06F 11/0727 707/691 |
| 2014/0279600 A1 | 9/2014 | Chait |
| 2014/0281528 A1 | 9/2014 | Dubey et al. |
| 2015/0040181 A1 | 2/2015 | Cook et al. |
| 2015/0058839 A1 | 2/2015 | Madanapalli et al. |
| 2015/0074828 A1 | 3/2015 | Beauregard et al. |
| 2015/0128250 A1 | 5/2015 | Lee et al. |
| 2016/0203313 A1 | 7/2016 | El-Moussa et al. |
| 2016/0217159 A1 | 7/2016 | Dahan et al. |
| 2016/0378962 A1 | 12/2016 | Austin |
| 2017/0011220 A1 | 1/2017 | Efremov et al. |
| 2017/0048259 A1 | 2/2017 | Dodge et al. |
| 2017/0054760 A1 | 2/2017 | Barton et al. |
| 2017/0111368 A1 | 4/2017 | Hibbert et al. |
| 2018/0024895 A1 | 1/2018 | Kumarasamy et al. |
| 2018/0302409 A1 | 10/2018 | Hope |
| 2019/0121631 A1 | 4/2019 | Hua et al. |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A1 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman and Justin Pot; "How to Install Applications on a Mac: Everything You Need to Know"; HowToGeek.com website [full url in ref.]; Jul. 20, 2017 (Year: 2017).

Chris Hoffman; "How to Disable System Integrity Protection on a Mac (and Why You Shouldn't)"; HowToGeek.com website [full url in ref.]; Jul. 5, 2017 (Year: 2017).

Examination Report dated Apr. 29, 2020 for United Kingdom Patent Application No. GB1715628.2.

Examination Report dated Jun. 14, 2019 for United Kingdom Patent Application No. GB1600738.7.

Combined Examination & Search Report dated Feb. 6, 2018 for United Kingdom Patent Application No. GB1714489.0.

Combined Examination & Search Report dated Aug. 1, 2018 for United Kingdom Patent Application No. GB1802241.8.

Combined Examination & Search Report dated Nov. 16, 2018 for United Kingdom Patent Application No. GB1808380.8.

Combined Examination & Search Report dated Mar. 6, 2019 for United Kingdom Patent Application No. GB1814798.3.

Combined Examination & Search Report dated Dec. 1, 2017 for United Kingdom Patent Application No. GB1708824.6.

\* cited by examiner

CONTROLLING APPLICATIONS BY AN APPLICATION CONTROL SYSTEM IN A COMPUTER DEVICE

CROSS REFERENCE TO RELATED APPLICATIONS

This application claims the benefit of and priority to GB Patent Application No. 1814798.3, filed Sep. 12, 2018, entitled "Controlling Applications by an Application Control System in a Computer Device," which is incorporated herein by reference in its entirety.

BACKGROUND

Security is vitally important in modern computer networks, to protect against malicious threats and attacks. One important line of defense is to control the application programs which are permitted to execute on each computer device within an organisation's network. An application control system allows only certain applications to run on each computer device and prevents any other applications from operating. The application control system should be secure, and yet still meets the diverse needs of the relevant user populations.

TECHNICAL FIELD

The present disclosure relates generally to the field of computers and computer devices, and more particularly to an application control system which controls applications in a computer device.

SUMMARY

The application control system is faced with a competing set of demands. The set of authorised applications must be maintained, while adapting to a changing threat landscape as new vectors of attack are identified and exploited. Keeping the system up to date is a constant challenge. Typically, a set of rules or policies are administered centrally, which define the permitted set of application programs for each user and their associated computer devices. In practice, these rules tend to be relatively complex, given the number of applications which each user or user group might require. The applications themselves are often updated, i.e. by new or updated binary executables, and new applications are frequently released or required by certain users.

Each user will need access to a relevant set of applications in order to maintain productivity. The application control system ideally will assist and enable those users to meet their goals, rather than becoming an impediment or obstruction. These challenges are particularly difficult in larger organisations having many thousands computer devices, with widely varying needs and requirements according to the role of each user.

The examples herein have been provided with a view to addressing at least some of these problems, whether expressly mentioned above or will otherwise be appreciated from the teachings herein.

According to the present invention there is provided a computer-implemented method, a computer system and a computer-readable storage medium as set forth in the appended claims. Additional features will be appreciated from the dependent claims, and the description herein.

By way of introduction, an application control system (ACS) in a computer device intercepts a request to launch a requested application by a calling process and determines, based on the requested application, that user interaction is required. In response, the ACS establishes whether or not the calling process is associated with a controlling terminal and, if so, performs the user interactions using that controlling terminal. Where the user interactions are successful then the intended application is permitted to launch or, conversely, the requested application may be denied. Other solutions are provided in the event that the calling process is not associated with the controlling terminal.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding, and to show how example embodiments may be carried into effect, reference will now be made to the accompanying drawings.

DETAILED DESCRIPTION

The example embodiments will be discussed in detail in relation to computer devices using the LINUX family of Unix-like operating systems. However, the teachings, principles and techniques discussed herein are also applicable in other specific example embodiments, as will be appreciated from the following description.

LINUX is general-purpose operating system with a large installed base, usually distributed as free or open-source software. Linux is a Unix-like operating system, having behaviour similar to a Unix system, alongside others such as macOS (OS X), BSD, Minix, Aix, Solaris, etc. These Unix-like operating systems may, or may not, conform to all aspects of the Single UNIX Specification (SUS), or be certified to this standard, but share many aspects in common.

Figure 1:
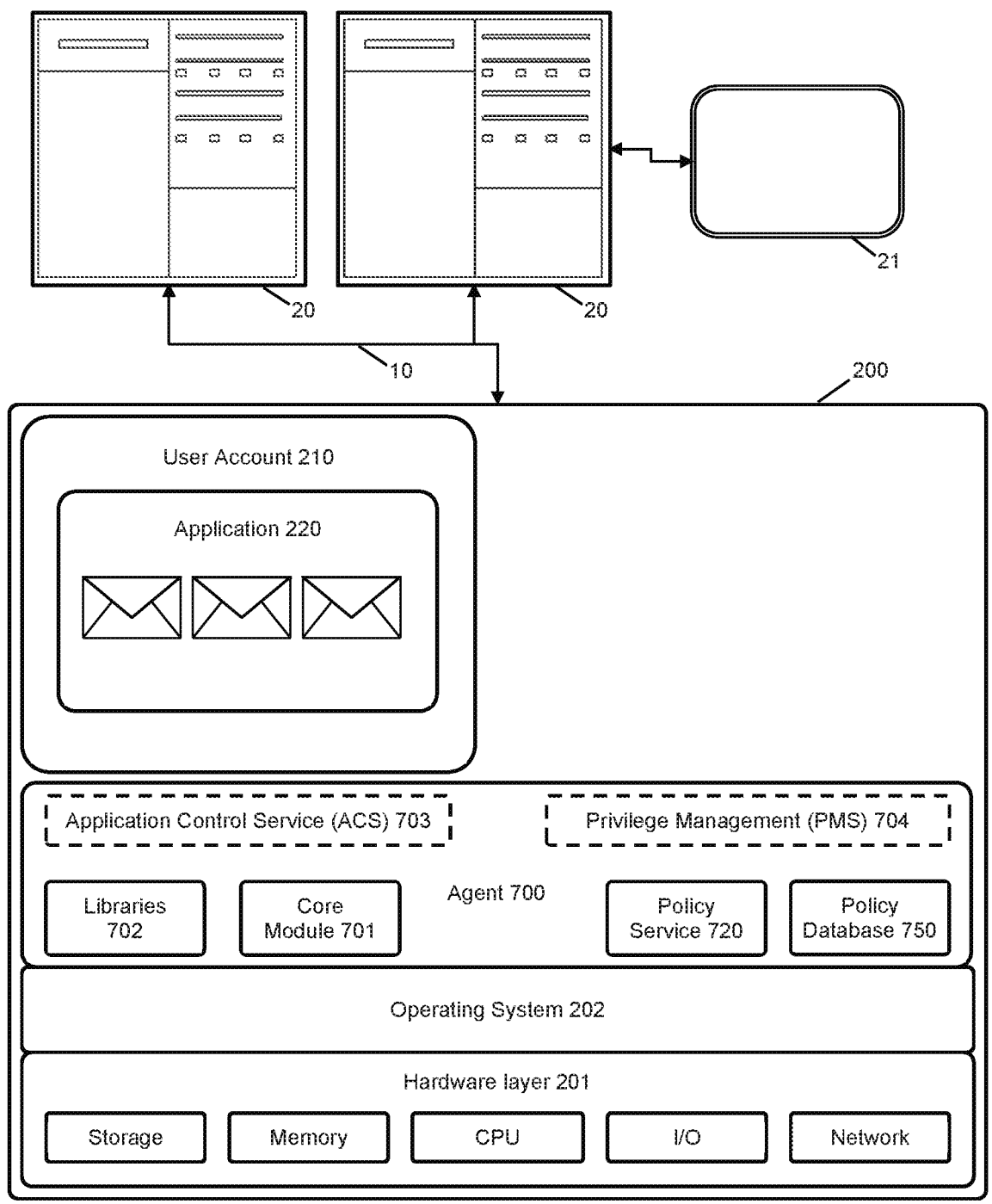
FIG. 1 is a schematic overview of an example computer device and network.

FIG. 1 is a schematic overview of an example computer device and network. In this example, an end-user client computer device 200 is coupled by a network 10 to a set of servers 20. For example, the network 10 can be a private network, a virtual private network, an intranet, a cloud, or the Internet. In practice, computing environments for large-scale corporations will typically include many thousands of individual end-user computer devices 200 coupled to many tens or many hundreds of servers 20.

Each end-user computer device 200 may take any suitable form factor. As examples, the device 200 might be a desktop computer, a portable computing device, laptop, tablet, smartphone, wearable device, or an emulated virtual device on appropriate host hardware via a virtualisation layer. In one example, the illustrated system could be formed from virtual machines connected by a software-defined network.

In this example, the computer device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202 executes on the hardware layer 201 to provide a runtime environment for execution of applications 220 and their related user processes. This runtime environment typically provides resources such as installed software, system services, drivers, and files. In this illustration, the applications 220 include an email client which is used to send and receive email messages. Of course, many other types of software application are available and can be provided according to the needs of the user of each particular device.

In this example, the operating system 202 applies a security model wherein access privileges are based on a user account 210. The operating system 202 may define privilege levels appropriate to different users, classes of users, or groups of users, and then apply the privileges of the relevant user, class or group to the particular logged-in user (e.g. ordinary user, super-user, local administrator, system administrator, and so on). The user is authenticated such as by logging-in to the computer device 200, e.g. with a user identity and password, and these user credentials may be validated locally or via a remote service such as a domain controller. The current user, via their previously prepared security account 210, thus acts as a security principal in the security model. The operating system 202 of the computer device 200 then grants appropriate privileges to the processes and applications 220 which execute in the security context of that primary user account 210.

In this example, the computer device 200 further comprises an agent 700. The agent 700 may comprise one or more software and/or hardware modules, such as executables, dynamic libraries, plug-ins, add-ins, add-ons or extensions. In a Unix-like environment, a core module 701 may comprise a daemon, which runs as a background process on the computer device 200. In the context of Windows® operating systems, the agent 700 may comprise a core module 701 implemented as a Windows service. The agent 700 may further comprise one or more injected libraries 702 (i.e. dynamic linked library, DLLs) which may be injected by a driver into the context of the user account 210. Thus, the agent 700 is configured to operate in close cooperation with the operating system 202 and with the client applications 220.

In this example, the agent 700 supports capabilities for improving security of the computer device 200. The agent 700 acts as a secure gatekeeper to control activity on the computer device 200 in addition to, and in cooperation with, the native security mechanisms of the underlying operating system 202. In particular, the agent 700 suitably includes an application control service ACS 703. In this example, the agent 700 optionally further includes a privilege management system PMS 704. These systems may be separate and distinct components within the agent 700, or may be implemented, whether wholly or partially, within the core service 701, the libraries 702 and/or other components or modules. In other examples, the functions of the ACS 703 could be provided in a separate stand-alone component, or might integrated within a modified version of the operating system 202. Likewise, the functions of the PMS 704 could be provided in a separate stand-alone component, or may be integrated within a modified version of the operating system 202.

When considering privilege management, it is desirable to implement a least-privilege access security model, whereby each user is granted only a minimal set of access privileges. Many application programs however require a relatively high privilege level, such as a local administrator level, in order to be installed, modified or removed. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, e.g. by accidently modifying system settings within the operating system 202, leading to errors or corruption within the computer device 200. Further, an infection or malware may access the computer device 200 with the deliberate intention of subverting security or causing damage, e.g. to hide a key logger to obtain credit card numbers or bank details.

In one example, the primary user account 210 has a relatively low privilege level. The agent 700 then selectively enables access to higher privilege levels, e.g. a local administrator level, when needed to perform certain tasks. Thus the agent 700 provides the alternate privilege level to perform a specific task, but does not provide a high level privilege generally to the user account 210. Conversely, the agent 700 in some examples is also able to downgrade the privilege level, so that certain tasks are carried out at a privilege level lower than that of the current user account 210.

For application control, the agent 700 is arranged to ensure that only authorised applications 220 are executed on the computer device 200. For example, the agent 700 may comprise a list of approved and/or restricted applications. There may be a sophisticated set of rules which define the conditions under which each application may be launched in relation to the intended host computer device 200 and the relevant user account 210. Thus, in this example, the email client application 220 on the computer device 200 will only be launched if permitted by the agent 700.

In one example, the agent 700 is coupled to a policy database or policy file 750. The policy file 750 stores a set of policies which define responses of the agent 700 to requested actions or tasks. A policy service 720 may be provided to make policy decisions based on the policy file 750. Suitably, the policy service 720 is provided as a service locally on the computer device 200 with links to other components of the agent 700. In some examples, the policy service 720 may reside as a component within the agent 700, or can be implemented as a separate service that is communicably linked to the agent 700. The policy service 720 may operate by receiving a policy request message, which identifies a requested action and may provide or lead to related meta-information, and returning a policy result based thereon.

In one example, the agent 700 is configured to capture a set of identities relevant to an intended action or task on the computer device. Such identities may include, for example, a user identity (UID) of the relevant user account 210, a group identity (GID) of a group to which that user account 210 belongs, a process identity (PID) of a current process which has initiated the action or task in question, and/or a process identity of any parent process (PPID). The agent 700 may then provide these identities as part of the policy request. Suitably, the policy service 720 determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy service 720 as appropriate, but which is not accessible by the user account 210. Updates to the policy file 750 may be generated elsewhere on the network 10, such as by using a management console 21 on one of the servers 20, and then pushed, or pulled, to each instance of the agent 700 on each device 200. Thus, the policy file 750 is conveniently revised and maintained in some examples, but these updates depend upon action by system administrators and hence are not readily available in real time.

In this way, the agent 700 is robust and manageable for a large-scale organisation with many thousands of individual computer devices 200. In some examples, the agent 700 is able to leverage rules which have been developed in relation to application control, such as defining user groups or user roles and related application permissions, and extend those same rules also to privilege management, and vice versa.

In some examples, the agent 700 is configured to perform custom messaging. In particular, agent 700, whether acting directly or via a cooperating proxy or plugin, may present a message dialog to the user. Thus, the custom messaging may be presented on a display of the computer device 200 for interaction with the user. Input from the user may be returned to the agent 700 for evaluation. Hence, the agent 700 is able to interact with the user with a set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the user in order to proceed with the requested action. As an example, the additional authentication may require the user to again enter their username and password credentials, or may involve one or more of the many other forms of authentication (e.g. a biometric fingerprint or retinal scan). The challenge-response also allows alternate forms of authentication to be employed, such as a two-factor authentication. In one example, the challenge-response requires entry of a validation code, which might be provided such as from a second user device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file 750 to meet the evolving needs of a large user population.

Notably, custom messaging allows the agent 700 to provide a rich and informative set of interactions with the users. Each of these individual custom messaging actions may be defined in the policy file 750. The custom messaging may eventually result in a decision to allow or block the requested action. An appropriate allow or block operation is then carried out as required.

In this example, the agent 700 may further perform auditing of the requested action. In some examples, auditing is carried out only in relation to certain requests. The auditing may include recording the customised messaging, if any, and/or may include recording an outcome of the request. Audit reports may be extracted or uploaded from each end-user device 200 such as to the management console 21 on the servers 20 at any suitable time or frequency or based on any suitable event. Each of these auditing functions may be defined in the policy file 750.

In some examples, the agent 700 is configured to perform passive handing of a request. In this case, the request is presented to the originally intended recipient, typically within the operating system 202, and any responses may be returned transparently. In one example, passive handling is defined by the policy file 750. The agent 700 can meanwhile audit the requests which were handled passively, again consistent with the policy file 750. Notably, this passive handling function allows the action to proceed while the requesting user process or application is unaware of the agent 700 as intermediary. Advantageously, a default behaviour of system is maintained for those actions that the agent 700 determines should have passive handling. Also, there is now a fail-safe option, in that the system will maintain an expected behaviour for actions that are passively handled. This passive handling is useful particularly in the event that a particular user or request is not specified in the policy file 750, because default behaviour is still enacted. Hence, the system can now quickly and safely supersede the original behaviour for specific situations, allowing rapid responses and network-wide consistency when needed, while still enabling existing legacy functionality and behaviour to continue in place for other actions, users and/or devices, as appropriate.

User Interactions

Figure 2:
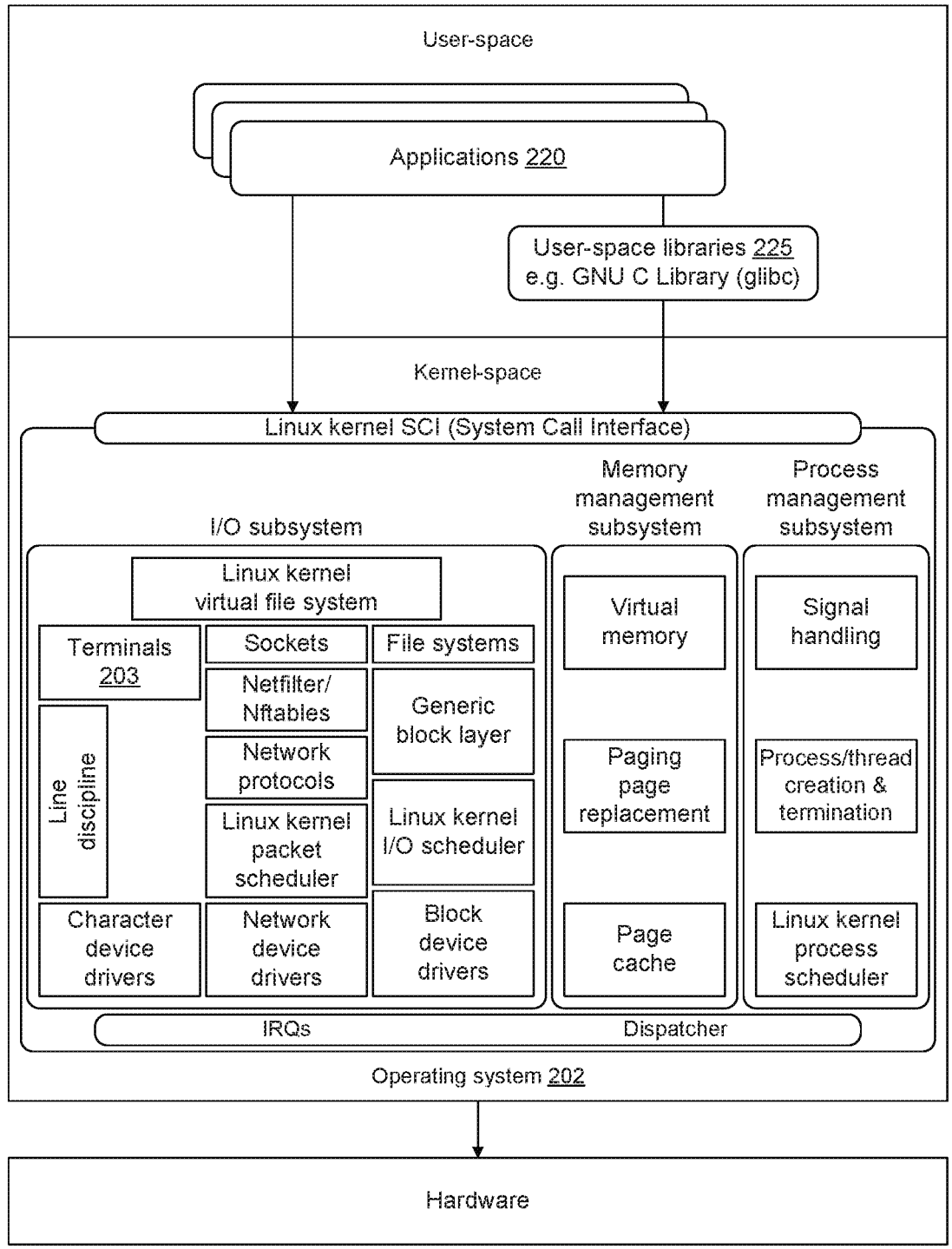
FIG. 2 is a schematic view illustrating an example of the operating system in more detail.
Figure 3:
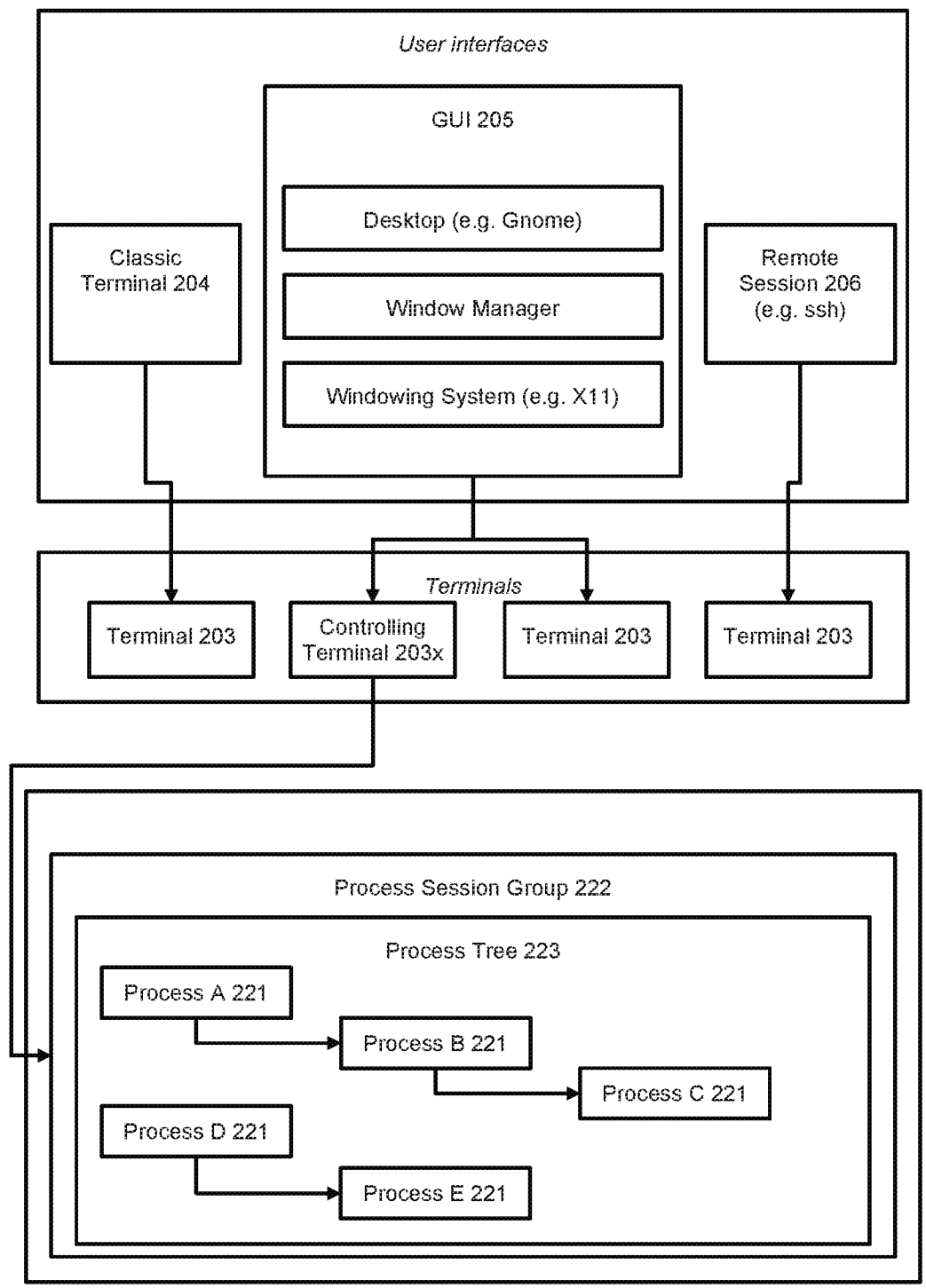
FIG. 3 is a schematic view illustrating some of the example user interface mechanisms of the example operating system.
Figure 4:
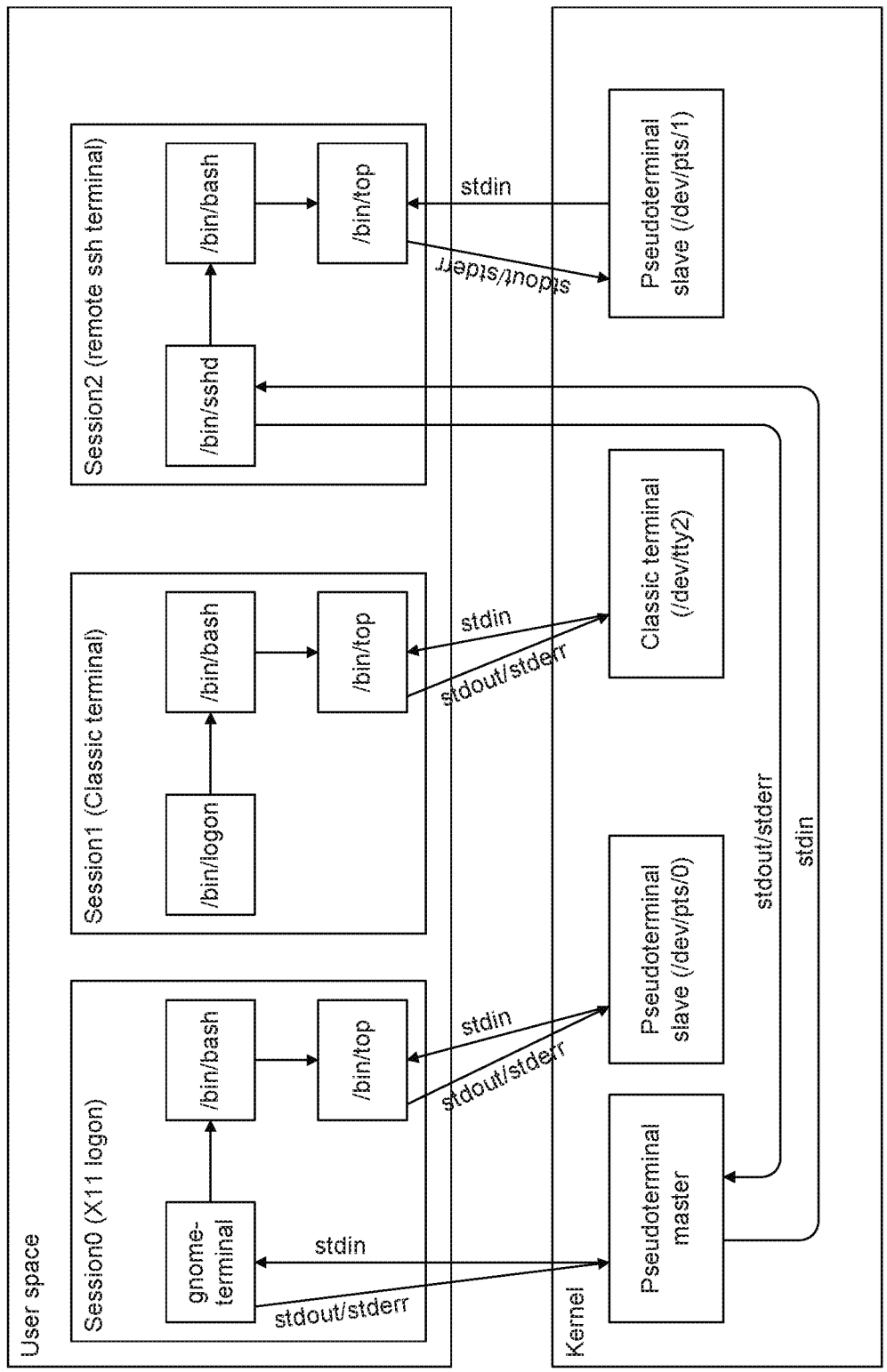
FIG. 4 is a schematic view illustrating a practical example situation within the computer device 200 involving multiple sessions.

FIG. 2 illustrates an example of the operating system 202 in more detail. FIG. 3 illustrates some of the example user interface mechanisms as supported by the OS 202. FIG. 4 illustrates a practical example situation within the computer device 200 involving multiple sessions.

Referring firstly to FIG. 2, the OS 202 is divided generally into user-space and kernel-space, with the kernel-space components being illustrated in more detail in the lower part of the diagram. The user applications 220 are supported by user-space libraries 225, such as glibc, and make use of a system call interface (SCI) to reach the kernel. Within the kernel, a set of terminals 203 allow those applications 220, by their related processes, to interact with the underlying hardware platform 201, such as a keyboard, mouse, display screen, touchscreen, etc.

Traditionally, Unix-like operating systems performed user interactions through a dedicated hardware console supporting purely textual character-based outputs to a physical display screen and purely textual character-based input from a physical keyboard. Hence, these operating systems are primarily configured to output text-based messages to the user and to receive in return text-based inputs. Within the OS 202, each terminal 203 commonly refers to one pair of such text-based input and output channels.

Referring now also to FIG. 3, a classic terminal 204 provides a simple text-based user interface. Several of these classic terminals can be established simultaneously. That is, most Linux systems support virtual terminals which can co-exist in the same user session, and conveniently the user can switch between the set of virtual terminals such as by using keyboard shortcuts or hot keys. Also, for many users, it is desirable to have a graphical user interface (GUI) 205. Typically, the GUI 205 is supported by a windowing system such as the X11 X Window System provided by X.Org Foundation (see x.org), and may also make use of a desktop such as Gnome from the GNOME Project (see gnome.org). In some examples, the OS 202 will also support a remote access session 206 across a network, such as by using Secure Shell SSH (see ssh.com). Hence, there are diverse ways in which a user might interact with the computer device 200 to launch the applications 220.

Each terminal 203 may be associated with the physical hardware layer 201, e.g. via device drivers and related components such as line discipline, or may be associated with other elements supported by the OS 202. For example, as further illustrated in FIG. 4, a particular terminal 203 may be associated with a slave pseudo-device of pseudo terminal, wherein the slave pseudo-device emulates the interactions of a real text terminal device while a master pseudo-device allows a terminal emulator process to control the slave.

Referring again to FIG. 3, the applications 220 that are launched by the user are executed in a set of processes 221 which together form a process tree 223. Typically, the OS 202 starts a new session responsive to the user logging on and allocates a session identity (session ID). All processes 221 launched within this session will be associated with the session ID, allowing this process session group 222 to be identified and, ultimately, terminated by the OS 202 when the user destroys the logon session (i.e. logs out). Each process 221 may spawn children in one or more generations, illustrated here by processes A-C. Likewise, processes D and E form another parent-child relationship within the process tree 223. This simplified example has been provided for ease of explanation, and practical instances are typically more complex.

In general, the executing processes 221 link directly or indirectly to the underlying hardware layer 201 of the computer device 200 via the terminals 203. Normally, one of these terminals 203 will be the controlling terminal 203x for a particular process 221 or process session group 222. However, it is also possible for the system to include other processes, e.g. running in background or which have been launched programmatically, which are not expected to perform user interactions. That is, one or more processes 221 may exist which are not associated with the controlling terminal 203x, or for which there is no other link though to the hardware layer 201.

FIG. 4 shows an example practical situation wherein a Linux system has three open user sessions, here corresponding to three different session IDs and hence three different process session groups 222. In this example, Session® was opened by logging in to an X11 GUI environment 205 as discussed above. Session1 was opened in a classic terminal 204. Session2 was opened by a remote connection 206 via SSH. In all three sessions the user has one terminal in which they are running the command top to view information about the other running processes on the system. FIG. 4 thus illustrates the associations of those sessions with the relevant terminals 203 in the kernel of the OS 202.

As also shown in FIG. 4, each application 220 in a Unix-like environment has three streams—namely the standard input stream 'STDIN', the standard output stream 'STDOUT' and the standard error stream 'STDERR'. These streams are typically attached to the controlling terminal 203x for that session, but any one or more of these streams can be redirected, wherein the input stream is redirected to an another input source such as a file or other device and/or the output and error streams are redirected to another output source. Hence, simply using the STDIN/STDOUT file descriptions might not reach a controlling terminal 203x.

Figure 5:
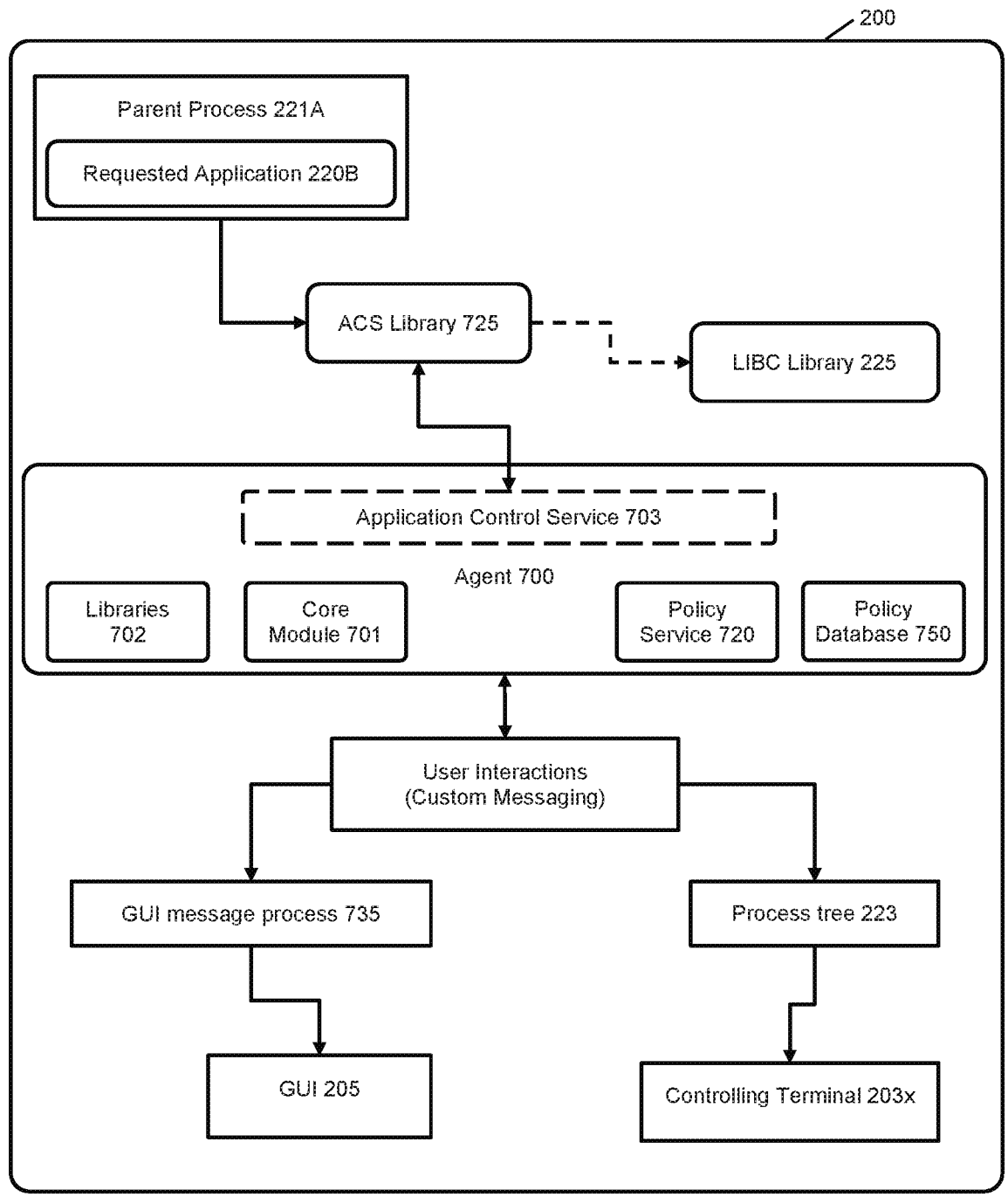
FIG. 5 is a schematic view illustrating an example application control system in more detail.

FIG. 5 is a further schematic view of the example computer device 200 to illustrate mechanisms which may be implemented by the application control system ACS 703 within the agent 700 as already introduced above.

The application control system (ACS) 703 acts as a gatekeeper to control whether or not each particular application 220 will be allowed to execute, alongside and in addition to the native security mechanisms of the operating system 202. Typically, a user initiates a request to launch an application, such as application 220B, with an interaction such as typing a command into a textual command line interface 204 or clicking on an icon in a graphical user interface (GUI) 205. In response, the operating system 202 will initiate launch of the requested application 220B as a new process. However, the ACS 703 intercepts creation of that new process and makes a decision whether or not to permit launch of the requested application 220B.

In this example, the ACS 703 makes use of a set of application control policies, such as in the policy database 750, which define rules for launching the application 220B. These rules are typically pre-configured and immutable, such as by being configured at the centralised system administrator console 21 on a server 20 as shown in FIG. 1, and then implemented locally on the computer device 200 by the agent 700. The rules may be updated periodically, such as by issuing an update from the central administration console 21, but may involve a long wait time. Also, the updates rely upon a connection over the network 10 between the computer device 200 and the server 20, which might be interrupted for example when the user device 200 is away from a regular office environment.

It can be difficult to provide a set of rules which comprehensively deals with the needs of the entire user population and every potential application and computer device. Typically, the requested application 220B has to be specifically identified and permitted by the ACS 703 according to the policies in the policy database 750. The default behaviour of the ACS 703 typically is to block (deny) any application which does not gain permission to proceed by virtue of those rules. Thus, the ACS 703 may enforce a block which prevents operating of an application 220B which is actually desirable and legitimate. At which point, the system typically requires the user device 200 to contact the central system administration console 21 (e.g. by raising a helpdesk ticket) and wait for rules to be updated before then proceeding with the desired application 220B. Notably, this is a weakness in the system which could be improved.

In one example, the system is configured with rules that give users a measure of influence over the ACS 703. That is, to make the application control system 703 more flexible, the rules may trigger interactions with the user which potentially allow the pre-configured current policies of the ACS 703 to be overridden. In this way, the ACS 703 becomes more configurable and responsive as a controlling gateway to execution of the applications 220 on the computer device 200. However, there is then a need to enable interactions with the user in order to achieve this enhanced operability.

As noted above, the ACS 703 is arranged to intercept process creation responsive to initiating launch of a requested application 220B by the calling process 221A. In one example, the intended application 220B is launched by calling a program execution function, e.g. execve( ), from the calling process 221A, including passing the filename of the intended application 220B. In response, the operating system 202 will replace the calling process 221A with new process information, which is equivalent to creating a new process but with some context maintained from the calling process 221A. In this example, the program execution function may be intercepted by the ACS 703 by providing an extra implementation of the execve( ) program execution function in an appropriate system library, e.g. libc. This additional implementation of the program execution function takes precedence by being added to a relevant configuration file (e.g. LD.SO.PRELOAD) which is used by a dynamic loader to inject an additional shared library 725 of the agent 700 ahead of the native system library 225. In this example, the ACS 703 operates in user-mode, which is convenient when implementing the ACS 703 in Linux. However, other specific Unix-like environments such as OS X might motivate a kernel-mode implementation instead.

In response to the intercept, the ACS 703 determines an outcome which is suitably either to permit or deny launch of the requested application 220B. In doing so, the ACS 703 may refer to the other elements within the agent 700 such as the policy service 720. If the application 220B is permitted, the ACS 703 gives control back to the real execve( ) function in the LIBC library 225 to continue process creation. Conversely, if the requested application 220B is denied, the ACS 703 may prevent process creation from proceeding any further within the OS 202. An appropriate error message may be returned to the calling process 221A indicating that launch of the requested application 220B has failed.

In this example, the ACS 703 also supports the custom messaging as part of the process of evaluating the requested application 220B. Firstly, the ACS 703 attempts to determine the controlling terminal 203*x* relevant to the requested application 220B. In one example, the ACS 703 gathers information about the parent process 221A, conveniently by using a system library function such as the procps-ng system library. This gathered information allows the ACS 703 to identify whether or not a controlling terminal 703*x* is associated with the parent process 221A. The controlling terminal 203*x* may be associated directly with that parent process 221A or may be discovered by traversing the relevant process tree 223 containing the parent process 221A. For example, the process ID of the parent process 221A is matched against the gathered information. Suitably, when the controlling terminal 203*x* is present and is identified, the ACS 703 then directs the user interactions to that controlling terminal 203*x*.

When the gathered information indicates that the parent process 221A is not associated with a controlling terminal 203*x*, other solutions are needed. In one example, the application 220B is launched responsive to user input through a GUI 205. In which case, that GUI 205 can be used to interact with the user, such as by displaying a dialog box. In this example, the ACS 703 is configured to launch a GUI message process 735, suitably when the user is logged on. The GUI message process 735 may then remain in a dormant state within the GUI 205. Conveniently, the GUI message process 735 is used later when needed by the ACS 703 to obtain user responses for the custom messaging, by using inter-process communications between the ACS 703 and that message process 735. In response, the GUI message process for example causes an appropriate dialog box to be displayed by the GUI 705 and returns the user responses to the ACS 703.

Where the ACS 703 determines that user interaction is not possible, e.g. where the controlling terminal 203*x* cannot be identified and where the GUI message process 735 is not available, then the ACS 703 suitably proceeds as if the user interaction had been cancelled by the user. That is, the policies suitably define a default outcome in the event that the user makes no response or cancels the requested interactions, which is then used as the outcome in this situation.

Figure 6:
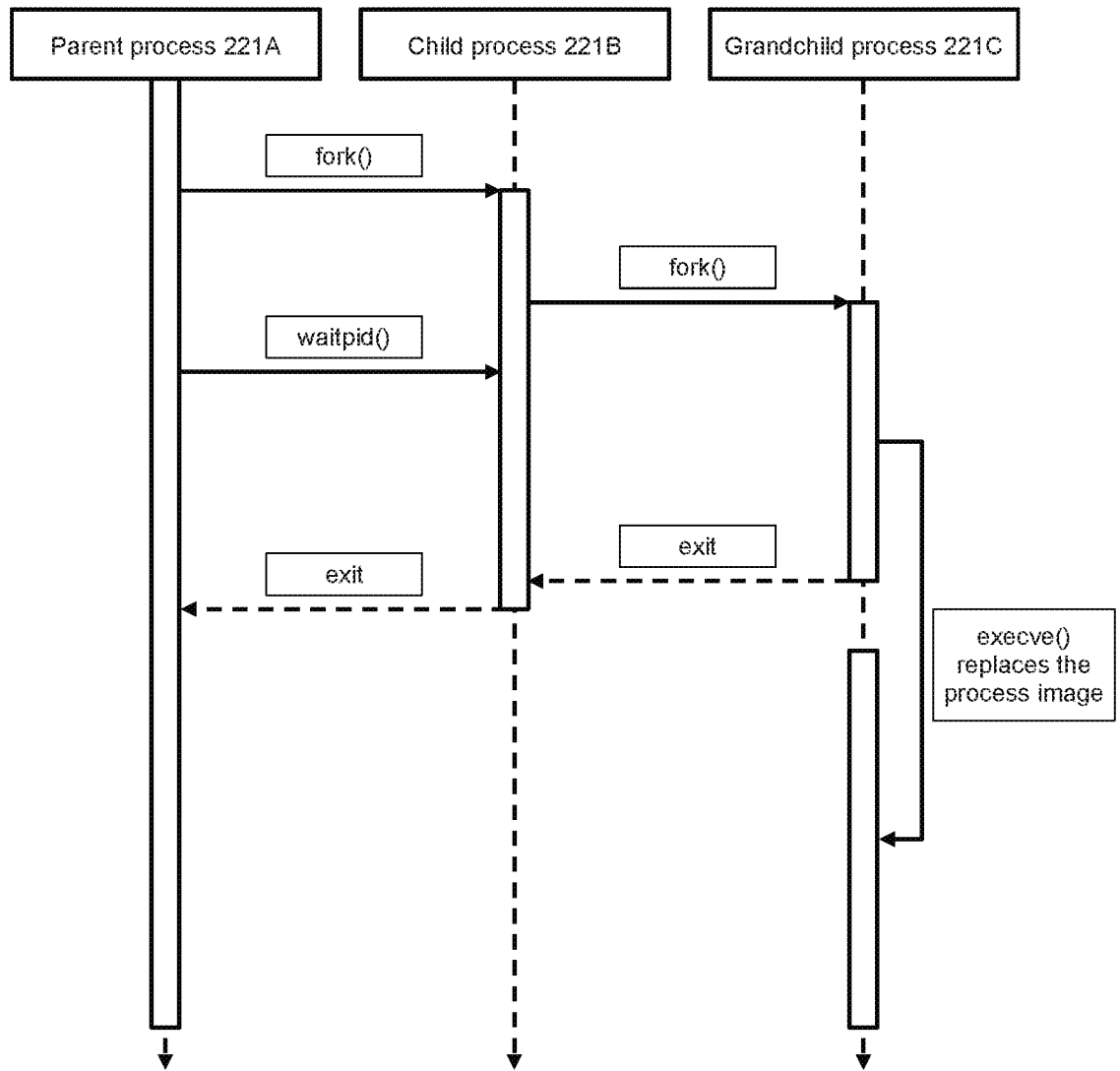
FIG. 6 is a schematic view illustrating a further example of the application control system in more detail.

FIG. 6 illustrates a further example situation within the computer device 200. In this example, the parent process 221A starts a child process 221B. That is, a fork causes the child 221B to be created, with its own execution context, as a duplicate of the parent process 221A. That is, the child 221B has its own process ID which will be unique to that process within the relevant process group, while the parent process ID of the child process 221B will be the same as the process ID of the parent process 221A. The child 221B by default will inherit configuration from the parent process 221A including inter alia a set of file descriptors. These file descriptors provide handles to access files, and allow file-like access to resources such as input/output resources, such as the STDIN/STDOUT/STDERR streams noted above.

It is often desirable to close one or more of those file descriptors, such as for security purposes before proceeding with execution in the child process 221B, or for example to give the child process 221B its own STDIN/STDOUT/STDERR file descriptors different from those of the parent process 221A. Many instances of Linux provide a close-on-execution file descriptor flag, also termed the CLOEXEC flag. This flag indicates that the specified file descriptor should be closed automatically upon calling execution of a file, e.g. by any of the exec( ) family of functions, from that child process 221B.

A further consideration arises in that it is common practice to fork twice in succession. For example, such a double fork is used to orphan a new target process which will then be used to launch the requested application 220, e.g. by calling the execve( ) function. A first fork from the parent 221A is used to create the child 221B, and then a second fork from the child 221B is used to create a grandchild 221C. This double fork avoids significant delays in the parent process and avoids leaving a zombie process. That is, the parent 221A makes a wait call, e.g. waitpid( ), to wait for termination of the child process 221B. In response, the parent process 221A will be notified following termination of the child 221B to clean up process information. Without the wait call the clean up does not occur, hence leaving the child 221B as a zombie occupying a process identity (PID). However, the wait call may introduce significant delays. Instead, the child 221B simply forks to create the grandchild 221C and then terminates, thereby quickly satisfying the wait call for the parent 221A.

As noted above, the ACS 703 intercepts the system call made by the grandchild process 221C which requests launch of a new application, e.g. the execve( ) function. In response, the ACS 703 iterates over a system directory, e.g. /proc/self/fd, of files containing file names matching open file descriptors. An example is shown in Table 1 below:

TABLE 1 total 0
dr-x------ 2    steven steven 0    May 16 11:50    .

TABLE 1-continued

| | | | |
|---|---|---|---|
| dr-xr-xr-x 9 | steven steven 0 | May 16 11:50 | .. |
| lrwx------ 1 | steven steven 64 | May 16 11:50 | 0 -> /dev/pts/0 |
| lrwx------ 1 | steven steven 64 | May 16 11:50 | 1 -> /dev/pts/0 |
| lrwx------ 1 | steven steven 64 | May 16 11:50 | 2 -> /dev/pts/0 |
| lrwx------ 1 | steven steven 64 | May 16 11:50 | 3 -> /proc/17624/fd |

For each file descriptor, the ACS 703 obtains the flags associated with that file descriptor, such as by using a file descriptor manipulation system call, e.g. fcntl, with a command, namely F_GETFD, to read the file descriptor flags for that file descriptor. If the close-on-exec flag, FD_CLO-EXEC, is set then the ACS 703 will close that file descriptor, i.e. by calling close( ).

Notably, without this procedure, the child process 221B will hang, because the wait call fails to return. That is, the wait call of the parent process 221A is dependent upon the child process 221B closing file descriptors for which the close-on-execute flag is set. If the child process 221B does not call an execute function, those file descriptors are not automatically closed. Hence, the ACS 703 now actively closes the relevant file descriptors, which allows the wait call on the child process 221B to return to the parent process 221A in a timely manner. The parent process 221A may then continue execution. Meanwhile, the requested application 220B launched by the grandchild process 221C is intercepted and an outcome determined by the ACS 703, suitably including user interactions as described above where specified by the relevant policies.

Hence, this procedure allows a double fork to be implemented successfully to orphan the grandchild process 221C, in combination with intercepting the execution call from that orphan process 221C to launch the requested application 220B.

Figure 7:
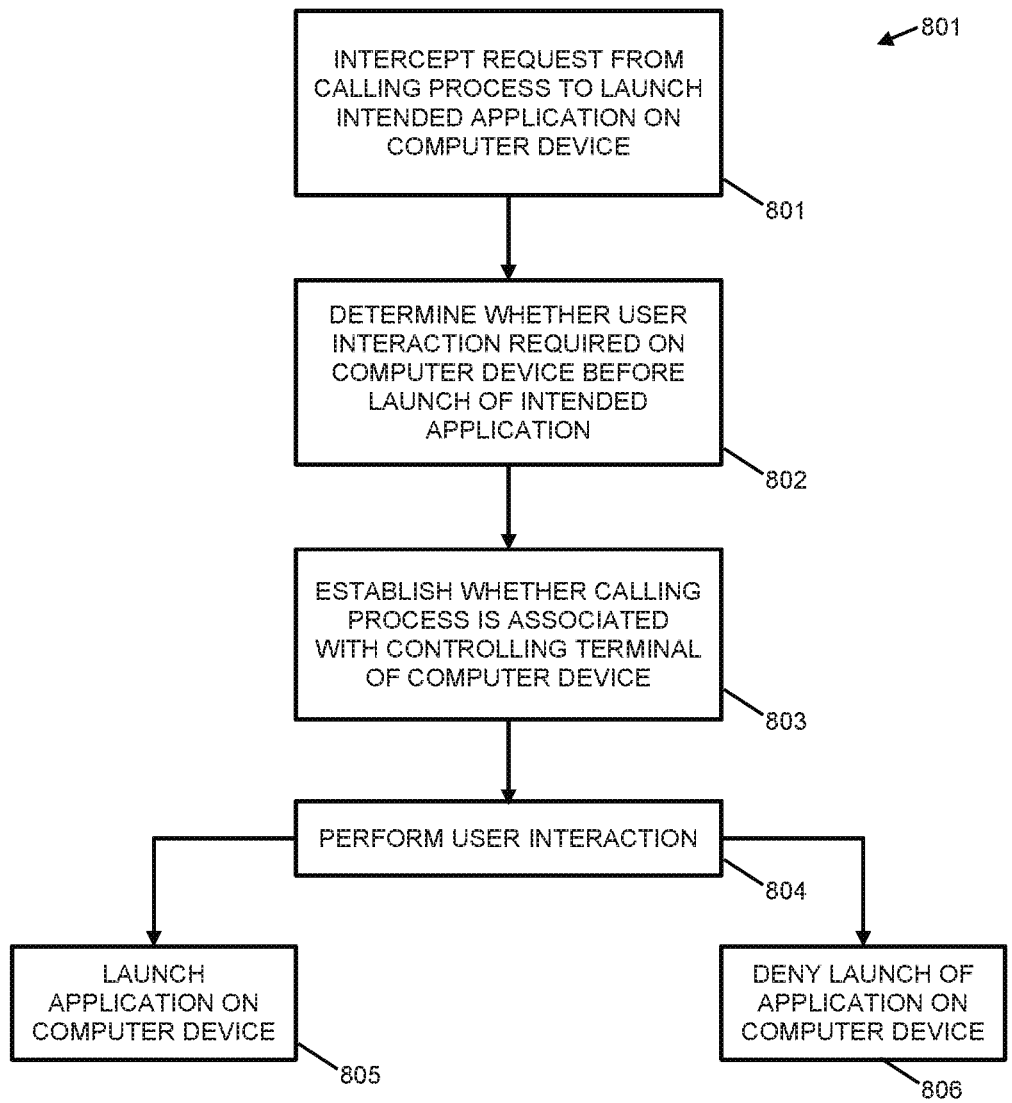
FIG. 7 is a flowchart of an example method which may be implemented in a computer device.

FIG. 7 is a flowchart illustrating an example method. In some embodiments, this method 800 can be carried out within the computer device 200 as already introduced above, such as by the agent 700 and in particular the application control service ACS 703.

In this example, step 801 includes intercepting a request to launch a requested application 220B by the calling process 221A, which identifies the requested application 220B. Step 802 includes determining, based on the requested application 220B, that user interaction is required before launch. Step 803 includes, in response, establishing whether or not the calling process 221A is associated with a controlling terminal 203x and, if so, performing user interactions using that controlling terminal 203x as at step 804. Suitably, as at step 805, where those user interactions are successful then the intended application 220B is permitted to launch or, conversely, the intended application 220B may be denied as at step 806.

In one example the step 803 may comprise traversing a process tree 223 containing the calling process 221A and discovering whether or not the controlling terminal 203x is associated with any process within the process tree 223. In one example the step 803 may comprise gathering at least a process identity (process ID) of the calling process 221A and traversing the process tree 223 based on at least that process ID.

In one example the method 800 may further include determining that the request to launch was initiated from a graphical user interface 205, and in response performing the user interactions by communicating with a message process 235 in the GUI 205. This may be done in response to establishing that the calling process 221A is not associated with the controlling terminal 203x. The message process 735 is suitably started in the GUI 205 responsive to the user logging in to the computer device 200.

Conveniently, when the calling process 221A is not associated with the controlling terminal 203x, and/or is not associated with the GUI 205, the method may include determining a default outcome from the user interactions without attempting to perform the user interactions.

In one example, the method 800 may include consulting a set of application control policies based on the information identifying the requested application, wherein the application control policies define that user interaction is required for the requested application and define a set of outcomes responsive to the user interaction. The application control policies may further define that user interaction is required for the requested application based also on a user identity of a logged-in user of the computer device. The application control policies may define that for at least one user launch of the requested application is always denied and that for at least one other user launch of the requested application is dependent upon the user interactions. Performing these user interactions may comprise presenting custom messaging information to the user, wherein the custom messaging is defined by the application control policies in relation to the requested application.

In one example the method 800 may comprise deciding an outcome in relation to the requested application 220B based on the user interactions, including selecting one of at least: permitting launch of the requested application; and denying launch of the requested application.

In one example the method 800 may comprise responsive to intercepting the request to launch of the requested application, iterating over a system directory containing file names matching open file descriptors, obtaining a set of flags associated with each file descriptor, and closing any file descriptors for which a close-on-execute flag is set.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The example embodiments have been described with reference to the components, modules and units discussed herein, but such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A method of controlling applications by an application control system in a computer device, the method comprising:
   intercepting, via the application control system, a request to launch a requested application on the computer device by a calling process executed by the computer device, wherein the request includes information identifying the requested application;
   determining, via the application control system, that user interaction is required before launching the requested application by consulting a set of application control policies based on the information identifying the requested application, wherein the set of the application control policies define that user interaction is required for the requested application based on a user identity of a logged-in user of the computer device and define a set of outcomes responsive to the user interaction;
   in response to determining that user interaction is required, establishing, via the application control system, whether or not the calling process is associated with a controlling terminal provided by an operating system of the computer device, wherein a process session group containing processes launched within a user session is selectively associated with the controlling terminal by the operating system; and
   in response to establishing that the calling process is associated with the controlling terminal, performing, via the application control system, user interactions using the controlling terminal.

2. The method of claim 1, wherein the establishing comprises:
   gathering at least a process identity of the calling process;
   traversing a process tree containing the calling process based on at least the process identity of the calling process; and
   discovering whether or not the controlling terminal is associated with a process within the process tree.

3. The method of claim 1, further comprising:
   in response to establishing that the calling process is not associated with the controlling terminal, determining, by the application control system, that the request to launch was initiated from a graphical user interface;
   starting a message process in the graphical user interface responsive to the user logging in to the computer device using the graphical user interface; and
   in response to determining that the request was initiated from the graphical user interface, performing the user interactions by communicating with the message process in the graphical user interface.

4. The method of claim 1, wherein the set of the application control policies define that launch of the requested application is always denied for at least one user and that launch of the requested application is dependent upon the user interactions for at least one other user.

5. The method of claim 1, wherein performing user interactions comprises presenting custom messaging information to the user, wherein the custom messaging is defined by the set of the application control policies in relation to the requested application.

6. The method of claim 1, wherein the application control system operates in addition to a native security mechanism of an operating system of the computer device.

7. The method of claim 1, further comprising, in response to establishing that the calling process is not associated with the controlling terminal, determining a default outcome from the user interactions without attempting to perform the user interactions.

8. The method of claim 1, wherein the set of outcomes comprises at least one default outcome.

9. The method of claim 1, wherein intercepting the request to launch the requested application comprises providing an implementation of a program execution function in a system library.

10. A computer device for controlling applications, the computer device comprising a hardware processor and being configured to:
    intercept a request to launch a requested application on the computer device by a calling process executed by the computer device, wherein the request includes information identifying the requested application;
    determine that user interaction is required before launching the requested application by consulting a set of application control policies based on the information identifying the requested application, wherein the set of the application control policies define that user interaction is required for the requested application based on a user identity of a logged-in user of the computer device and define a set of outcomes responsive to the user interaction;
    in response to determining that user interaction is required, establish whether or not the calling process is associated with a controlling terminal provided by an operating system of the computer device, wherein a process session group containing processes launched within a user session is selectively associated with the controlling terminal by the operating system; and
    in response to establishing that the calling process is associated with the controlling terminal, performing user interactions using the controlling terminal.

11. The computer device of claim 10, wherein the computer device is further configured to:
    gather at least a process identity of the calling process;
    traverse a process tree containing the calling process based on at least the process identity of the calling process; and
    discover whether the controlling terminal is associated with a process within the process tree.

12. The computer device of claim 10, wherein the computer device is further configured to:
    decide an outcome in relation to the requested application based on the user interactions, including selecting one of at least: permitting launch of the requested application; and
    deny launch of the requested application.

13. The computer device of claim 10, wherein the computer device is further configured to, in response to establishing that the calling process is not associated with the controlling terminal and that the request to launch was not initiated from a graphical user interface, determine a default outcome from the user interactions without attempting to perform the user interactions.

14. The computer device of claim 10, wherein a policy service is configured to make policy decisions based on the set of the application control policies.

15. The computer device of claim 14, wherein the policy service is provided locally on the computer device.

16. A non-transitory computer-readable storage medium for controlling applications, the non-transitory computer-readable storage medium having recorded thereon instructions that, when executed by a computer device, cause the computer device to:
- intercept a request to launch a requested application on the computer device by a calling process executed by the computer device, wherein the request includes information identifying the requested application;
- determine that user interaction is required before launching the requested application by consulting a set of application control policies based on the information identifying the requested application, wherein the set of the application control policies define that user interaction is required for the requested application based on a user identity of a logged-in user of the computer device and define a set of outcomes responsive to the user interaction;
- in response to determining that user interaction is required, establish whether or not the calling process is associated with a controlling terminal provided by an operating system of the computer device, wherein a process session group containing processes launched within a user session is selectively associated with the controlling terminal by the operating system; and
- in response to establishing that the calling process is associated with the controlling terminal, performing user interactions using the controlling terminal.

17. The non-transitory computer-readable storage medium of claim 16, wherein the controlling terminal is a terminal provided by an operating system of the computer device.

18. The non-transitory computer-readable storage medium of claim 16, wherein the instructions, when executed, further cause the computer device to: in response to establishing that the calling process is not associated with the controlling terminal, determine a default outcome from the user interactions without attempting to perform the user interactions.

19. The non-transitory computer-readable storage medium of claim 16, wherein the instructions, when executed, further cause the computer device to, responsive to intercepting the request to launch of the requested application:
- iterate over a system directory containing file names matching open file descriptors;
- obtain a set of flags associated with each file descriptor; and
- close any file descriptors for which a close-on-execute flag is set.

20. The non-transitory computer-readable storage medium of claim 19, wherein the file names match open file descriptors of the calling process or a parent process of the calling process.

* * * * *